United States Patent
Apfelbaum et al.

(10) Patent No.: US 9,959,233 B2
(45) Date of Patent: May 1, 2018

(54) NUMA-AWARE ROOT BUS SELECTION

(71) Applicant: Red Hat Israel, Ltd, Ra'anana (IL)

(72) Inventors: Marcel Apfelbaum, Afula (IL);
Michael Tsirkin, Raanana (IL)

(73) Assignee: RED HAT ISRAEL, LTD., Ra'Anana (IL)

( * ) Notice: Subject to any disclaimer, the term of this patent is extended or adjusted under 35 U.S.C. 154(b) by 376 days.

(21) Appl. No.: 14/698,349

(22) Filed: Apr. 28, 2015

(65) Prior Publication Data
US 2016/0321207 A1    Nov. 3, 2016

(51) Int. Cl.
*G06F 9/44* (2006.01)
*G06F 13/40* (2006.01)
*G06F 12/1009* (2016.01)
*G06F 9/455* (2018.01)
*G06F 13/42* (2006.01)

(52) U.S. Cl.
CPC ...... *G06F 13/4022* (2013.01); *G06F 9/45545* (2013.01); *G06F 9/45558* (2013.01); *G06F 12/1009* (2013.01); *G06F 13/4068* (2013.01); *G06F 13/4282* (2013.01); *G06F 9/4401* (2013.01); *G06F 2009/45562* (2013.01); *G06F 2009/45579* (2013.01); *G06F 2009/45583* (2013.01); *G06F 2009/45587* (2013.01); *G06F 2212/2542* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 7,756,943 B1 | 7/2010 | Wong | |
| 8,307,192 B2 | 11/2012 | Pandey et al. | |
| 8,443,376 B2 | 5/2013 | Bhandari et al. | |
| 8,694,728 B2 | 4/2014 | Waldspurger et al. | |
| 8,776,050 B2 | 7/2014 | Plouffe et al. | |
| 2010/0251234 A1* | 9/2010 | Oshins | G06F 9/4856 718/1 |
| 2013/0152086 A1 | 6/2013 | Yoo et al. | |
| 2014/0068603 A1 | 3/2014 | Tsirkin et al. | |
| 2015/0342095 A1* | 11/2015 | Tanaka | G06F 3/06 361/679.51 |

OTHER PUBLICATIONS

"Hyper-V Virtual NUMA Overview" Jun. 24, 2013, https://technet.microsoft.com/en-us-library/dn282282.aspx.
"Performance Best Practices for VMware vShpere® 5.1" VMware, Inc. http://www.vmware.com/pdf/Perf_Best_Practices_vSphere5.1.pdf.
"Receive Side Scaling" ftp://ftp.supermicro.com/CDR-89_1.01_for_Intel_B9_platform/intel/LAN/v18.4/PRO1000/DOCS/SERVER/rss.htm.

* cited by examiner

*Primary Examiner* — Scott Sun
(74) *Attorney, Agent, or Firm* — Haynes and Boone, LLP

(57) ABSTRACT

A method includes determining a first host Non-Uniform Memory Access (NUMA) node of a plurality of host NUMA nodes on a host machine that provides a virtual machine to a guest, the first host NUMA node being associated with a pass-through device, creating a virtual NUMA node on the virtual machine, mapping the virtual NUMA node to the first host NUMA node, adding a virtual expander to a virtual root bus of the virtual machine, and associating the virtual expander with the virtual NUMA node.

20 Claims, 5 Drawing Sheets

NUMA-AWARE ROOT BUS SELECTION

BACKGROUND

The present disclosure relates generally to virtual computing systems, and more particularly, use of physical Peripheral Component Interconnect (PCI) devices for virtual computing systems.

A host machine (e.g., computer or server) is a computing system that is typically enabled to simultaneously run one or more virtual machines, where each virtual machine may be used by a local or remote client. The host machine allocates a certain amount of execution time from the host's physical processors to each of the virtual processors. Each virtual machine may use the allocated resources to execute applications, including operating systems known as guest operating systems.

A virtual machine is a piece of software that, when executed on appropriate hardware, creates an environment allowing the virtualization of an actual physical computer system. Each virtual machine running on the physical system may function as a self-contained platform, running its own operating system (OS) and software applications (processes) on one or more virtual processors.

In many cases, a host machine has multiple processors. Some host machines with multiple processors utilize Non-Uniform Memory Access (NUMA) architecture. Such architecture involves multiple NUMA nodes, each NUMA node representing a region of host memory and a subset of the multiple processors. That way, each processor can access the region of memory in its own NUMA node faster than it can access memory in other NUMA nodes. It is desirable to have virtual machines that operate with such architecture in an efficient manner.

SUMMARY

According to one example, a method includes determining a first host Non-Uniform Memory Access (NUMA) node of a plurality of host NUMA nodes on a host machine that provides a virtual machine to a guest, the first host NUMA node being associated with a pass-through device, creating a virtual NUMA node on the virtual machine, mapping the virtual NUMA node to the first host NUMA node, adding a virtual expander to a virtual root bus of the virtual machine, and associating the virtual expander with the virtual NUMA node.

According to one example, a method includes determining that a first host Non-Uniform Memory Access (NUMA) node of a plurality of host NUMA nodes on a host machine is associated with a first pass-through device, the host machine providing a virtual machine to a guest, creating a first virtual NUMA node on the virtual machine, mapping the first virtual NUMA node to the first host NUMA node, adding a first virtual Peripheral Component Interconnect (PCI) expander bridge to the virtual machine, associating the first virtual PCI expander bridge with the first virtual NUMA node, and attaching the first pass-through device to the first virtual PCI expander bridge.

According to one example, a management system includes a processor and a memory comprising machine readable instructions, that when executed by the processor, cause the system to query a host machine to determine that a first host Non-Uniform Memory Access (NUMA) node of a plurality of host NUMA nodes of the host machine is associated with a pass-through device, the host machine providing a virtual machine to a guest, add a virtual NUMA node on the virtual machine, the first virtual NUMA node being mapped to the first host NUMA node, add a virtual PCI expander bridge to the virtual machine, the virtual PCI expander bridge being associated with the virtual NUMA node, and attach the pass-through device to a root bus of the first virtual PCI expander bridge.

Figure 1:
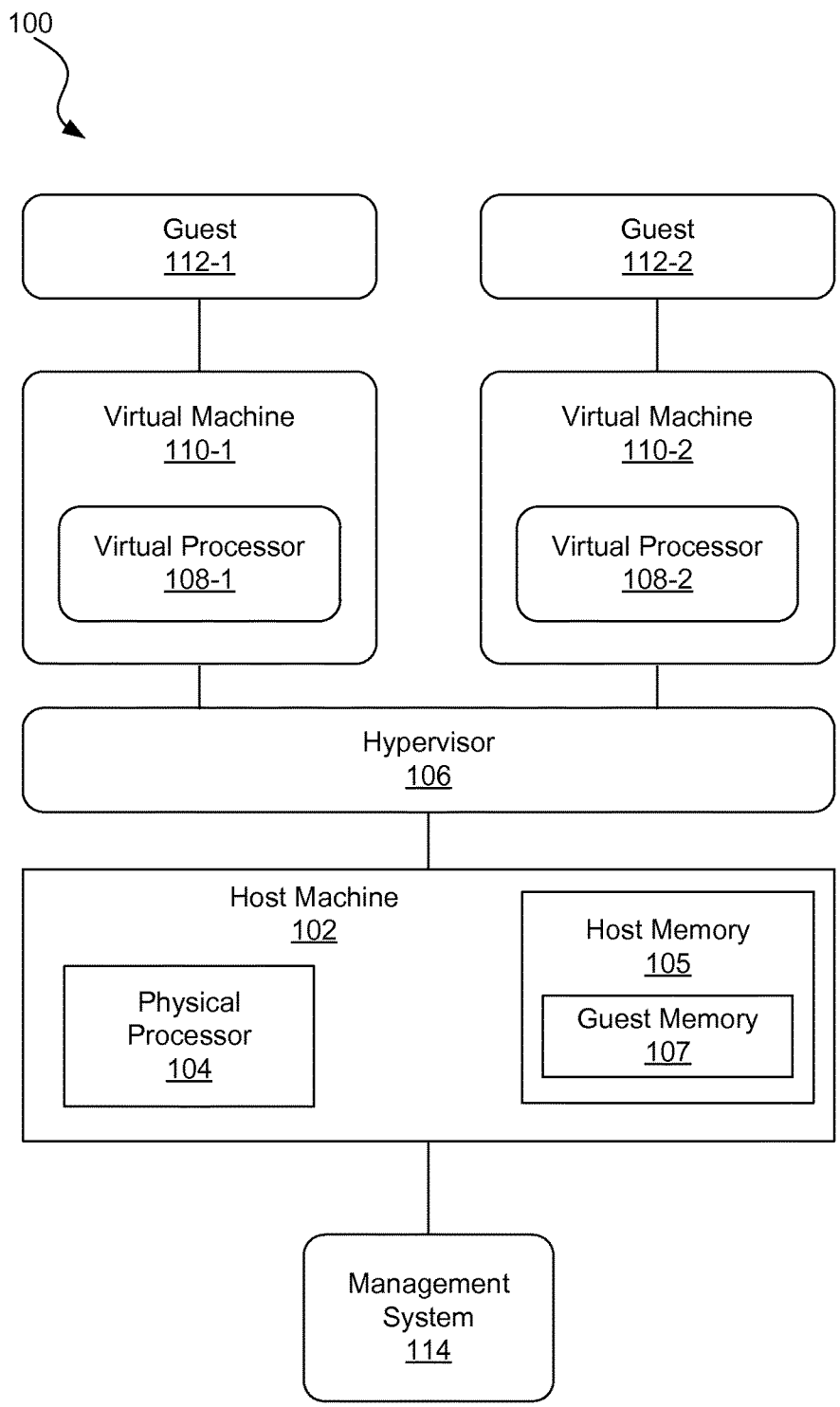
FIG. 1 is a diagram showing an illustrative host system running a plurality of virtual machines, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, some physical host machines use NUMA architecture. NUMA architecture involves multiple NUMA nodes, each NUMA node representing a region of host memory and a subset of the multiple processors. In some examples, each NUMA node has its own host bridge that connects the processor of that NUMA node to the memory of that NUMA node. The host bridge may also support an input/output bus such as a Peripheral Component Interconnect (PCI) root bus. Various devices, such as PCI device, can be attached to that root bus.

When such a host machine provides a virtual machine to a guest, the virtual memory for that guest may be fragmented across multiple NUMA nodes. A virtual machine can also include virtual NUMA nodes that map to underlying host NUMA nodes to allow the virtual machine to operate more efficiently. Sometimes, however, it is desirable to attach a pass-through device to a virtual machine. This involves physically attaching the pass-through device to the physical machine and allowing that device to interact with the virtual root bus of the virtual machine. But, if the virtual root bus is associated with a virtual NUMA node that maps to a host NUMA node other than the host NUMA node to which the pass-through device is physically attached, then the performance of that pass-through device may be degraded.

According to principles described herein, methods and systems for attaching a pass-through device to a virtual machine such that the device is attached to an appropriate NUMA node are described. In one example, a management system ensures that a pass-through device is connected to the proper virtual NUMA node in a manner that allows for enhanced performance of the pass-through device. The management system may be an entity that is external to the host machine. The management system may manage multiple virtual machines provided by multiple host machines that are in communication with each other over a network.

According to one example, the management system determines the host NUMA node to which a pass-through device for use by a guest has been attached. The management system then adds a virtual NUMA node to the virtual machine associated with the guest. That virtual node is then mapped to the host NUMA node to which the pass-through device is physically attached. The management system then creates a virtual expander such as a PCI Expander Bridge (PXB) that is behind the virtual root bus of the virtual machine. As will be described in further detail below, the PXB acts as an expander bridge, similar to a host bridge. A virtual root bus can thus be attached to the PXB. The root bus provided by the PXB is in association with the created virtual NUMA node. The hypervisor then exposes to the guest, the association between the root bus of the PXB and the created virtual NUMA node. The management then attaches the pass-through device to the root bus of the PXB.

Using the above described method, the performance of the host machine and pass-through device will be increased. Specifically, when performing input/output operations, the pass-through device will utilize memory space within the memory region of the host NUMA node to which it is attached. Because the pass-through device is attached to a virtual root bus associated with a virtual NUMA node that maps to that host NUMA node, there is less processing overhead. This is because less data has to be transferred between different NUMA nodes.

FIG. 1 is a diagram showing an illustrative system 100 involving a plurality of virtual machines 110. According to the present example, a physical system, such as a host machine 102 includes hardware such as a processor 104 and a host memory 105. The system 100 also includes a hypervisor 106. The hypervisor 106 supports a first virtual machine 110-1 and a second virtual machine 110-2. Although two virtual machines 110 are illustrated, other examples including fewer than two virtual machines or more than two virtual machines are within the scope of the present disclosure. The virtual machines provide the guest operating systems 112 with a virtual platform on which to operate.

The hypervisor 106 allows for multiple virtual machines 110, and thus multiple guests 112, to run on the same physical host machine 102. Additionally, the host machine 102 may run the multiple guests 112 concurrently and in isolation from other programs on the host machine 102. One guest 112-1 may run different type of operating system than another guest 112-2 being run on the same host machine 102. Additionally, the operating system associated with a guest 112 running on a virtual machine 110 may be different from the host operating system running on the host machine 102.

A guest 112 may include anything executed on a virtual machine 110-1. For example, a guest 112 may include an operating system, applications running on that operating system, data storage associated with the applications and operating system, drivers, etc. In one example, a guest 112-1 may be packaged as a large set of data that is loaded into host memory 105. The hypervisor 106 then interacts with that large set of data to execute instructions on one of the virtual machines 110.

The host memory 105 refers to the working memory of the host system. Working memory is typically Random Access Memory (RAM) and is designed for speed. Working memory is often a volatile form of memory, meaning that it loses its data when power is no longer supplied. The host system 102 may, however, have other forms of memory available such as solid state drives, Network-Attached Storage (NAS) drives, Redundant Array of Independent Disks (RAID) drives, and other non-volatile storage devices. The various types of memory may store information in the form of software and data. The host memory 105 may designate various blocks of memory for use by the hypervisor 106 or for use by the guests 112 using the virtual machines 110. These blocks of memory may be ranges of physical memory addresses or virtual memory addresses.

A certain portion of the host memory 105 is dedicated to guest memory 107. The total guest memory 107 may be made available for multiple guests 112 to use. As described above, the guest memory may be divided into different regions or modules, each module associated with a different NUMA node. Thus, different processors associated with different NUMA nodes can access different memory regions of guest memory at different speeds, or in a non-uniform manner.

In the example illustrated in FIG. 1, virtual machines 110 are platforms on which the guests 112 run. The virtual machines 110 include virtual processors 108 which are designed to appear to the guests 112 as physical processors. The hypervisor 106 manages the host machine 102 resources and makes them available to one or more guests 112 that alternately execute on the same hardware. The hypervisor 106 manages hardware resources and arbitrates requests of the multiple guests. In an example, the hypervisor 106 presents a virtual machine that includes a virtual set of Central Processing Unit (CPU), memory, I/O, and disk resources to each guest either based on the actual physical hardware or based on a standard and consistent selection of custom hardware. A virtual machine has its own address space in memory, its own processor resource allocation, and its own device input/output (I/O) using its own virtual device drivers.

The hypervisor 106 can map a virtual resource or state (e.g., registers, memory, or files) to real resources in the underlying host machine 102. For example, the hypervisor 106 may present a guest memory to guest 112-1. The hypervisor 106 may map the memory locations of guest memory to physical memory locations of memory 105.

To facilitate multiple virtual machines 110 simultaneously, hardware resources are shared among the hypervisor 106 and one or more guests 112. The physical processors 104 of the host machines enter and exit the context of different virtual processors 108 and the hypervisor 106. A virtual machine exit marks the point at which a context switch occurs between the virtual processor 108 currently running and the hypervisor 106, which takes over control for a particular reason. During the context switch, the processor 104 may save a snapshot of the state of the virtual processor that was running at the time of exit. The virtual machine exit is handled by the hypervisor 106, which decides the appropriate action to take and then transfers control back to the virtual processor 108 via a virtual machine entry. A virtual machine entry marks the point at which a context switch occurs between the hypervisor 106 and a virtual processor 108, which takes over control.

The host machine 102 is in communication with a management system 114. The management system 114 manages multiple virtual machines (similar to virtual machines 110) running on multiple host machines (similar to host machine 102). For example, the management system 114 may determine if a new virtual machine is needed and cause one of the host machines to provision a new virtual machine. The management system 114 may also specify various characteristics of that virtual machine. The management system 114 may also tear down virtual machines that are no longer needed.

Figure 2:
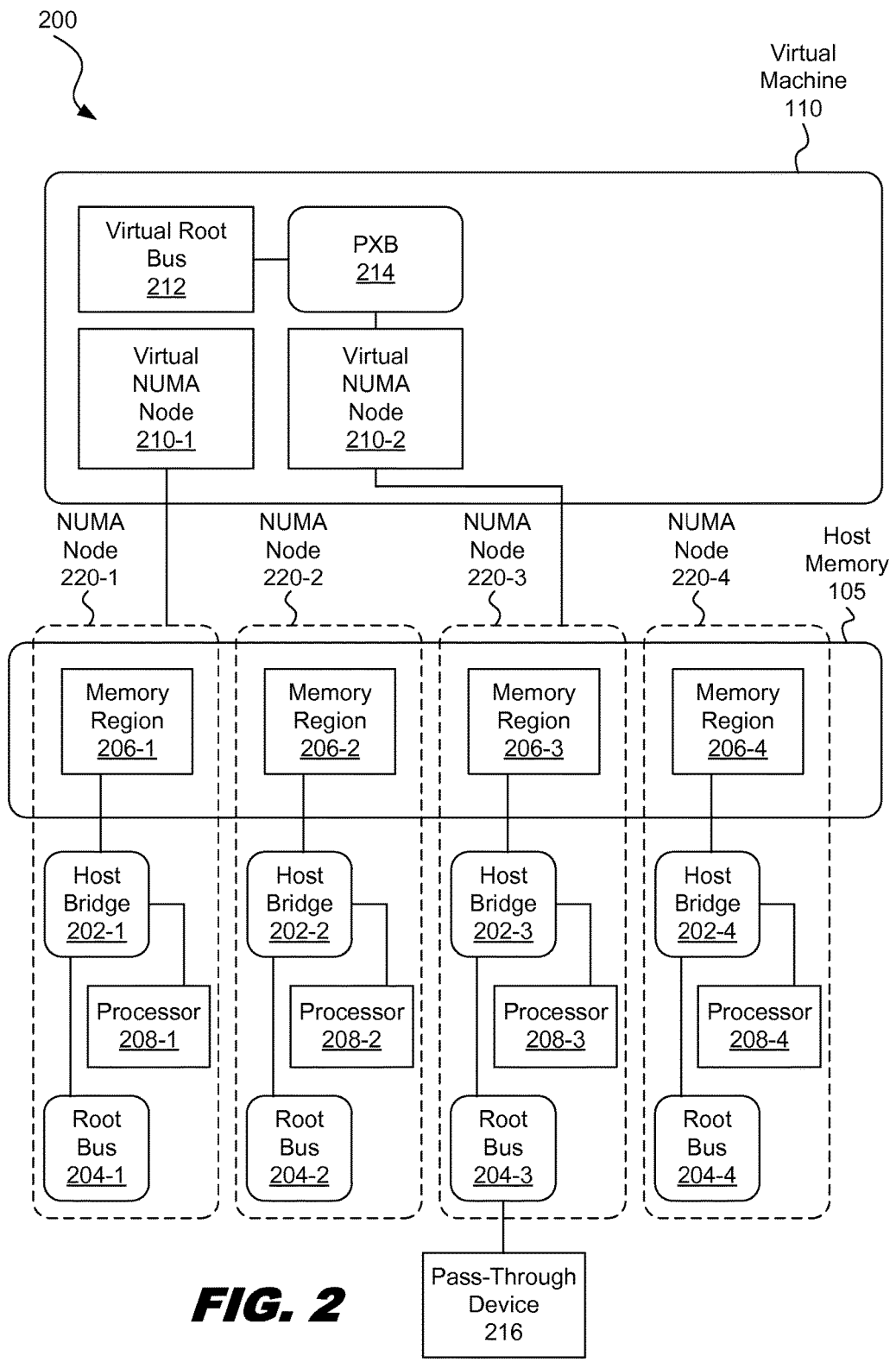
FIG. 2 is a diagram illustrating root bus selection for a pass-through device at creation of a virtual machine, according to one example of principles described herein.

FIG. 2 is a diagram illustrating root bus selection for a pass-through device at creation of a virtual machine. According to the present example, a host machine (e.g. 102, FIG. 1) has four host NUMA nodes 220-1, 220-2, 220-3, 220-4. Thus, the host memory 105 is divided into four different memory regions 206-1, 206-2, 206-3, 206-4. Each memory region 206 is associated with a different host NUMA node 220.

Each host NUMA node 220 has its own host bridge 202-1, 202-2, 202-3, 202-4 and its own processor 208-1, 208-2, 208-3, 208-4. In some cases, a host NUMA node 220 may have more than one processor 208. A host bridge 202 provides data access mappings between the processor 208 and input/output devices connected to a root bus 204 associated with the host bridge 202. The host bridge 202 has access to the memory region 206. In one example, the root bus is a PCI root bus that provides slots for thirty-two peripheral devices.

A host operating system running on the host machine includes a device configuration space, such as a PCI configuration space, that specifies the memory and input/output (IO) address ranges assigned to PCI devices (e.g., pass-through device 216). In some examples, the device configuration space includes one or more registers, tables, lists or other data structures that associate memory and I/O address ranges with corresponding devices that are coupled to the a root host bus of the host machine. In the case of a host machine with multiple host NUMA nodes 220, there may be multiple root buses 204, each root bus 204-1, 204-2, 204-3, 204-4 associated with a different host NUMA node 220. There may be a device configuration space associated with each host NUMA node 220. Specifically, the device configuration space for a particular host NUMA node 220 includes mapping data for devices connected to the root bus 204 of that particular host NUMA node 220.

In the present example, a pass-through device 216 is connected to host NUMA node 220-3. The configuration space associated with root bus 204-3 specifies address ranges within memory region 206-3 for use by pass-through device 216. Thus, when the pass-through device sends data to the host machine, such data is written to memory region 206-3.

In the present example, the host machine provides a virtual machine 110. The virtual machine includes a first virtual NUMA node 210-1. Virtual NUMA node 210-1 is associated with the virtual root bus 110. Additionally, virtual NUMA node is mapped to host NUMA node 220-1. Thus, data that is stored in association with virtual NUMA node 210-1 is physically stored in memory region 206-1 of host NUMA node 220-1.

Without the benefit of principles described herein, when pass-through device 216 acts as a pass-through device, it will attach to the virtual root bus 212 of the virtual machine. Moreover, when the pass-through device 216 sends data, that data will be written to memory region 206-3 of host NUMA node 220-3. But, the virtual root bus 212 may be associated with host NUMA node 206-1 and thus there is additional processing overhead involved in reading data stored within a different NUMA node.

According to one example of principles described herein, when the virtual machine 110 is created, a management system (e.g. 114, FIG. 1) determines the NUMA node 220 to which the pass-through device 216 to be used by the virtual machine is connected. In this example, the pass-through device 206-1 is connected to host NUMA node 220-3. The management system then causes the virtual machine 110 to have a virtual node 210-2 that maps to appropriate host NUMA node, which in this example is host NUMA node 220-3. Additionally, the management system causes the virtual machine to have a virtual expander such as a PCI Expander Bridge (PXB) 214 connected to one of the slots for the virtual root bus. In one example, the PXB 214 is a kind of host bridge. A root bus can then be attached to the PXB 214. More detail on the PXB 214 will be described below with the text accompanying FIG. 4. The PXB 214 is associated with virtual NUMA node 210-2.

With the virtual machine 110 created in such a way, particularly with the additional virtual NUMA node 210-2 and the PXB 214, the hypervisor running on the host machine can expose to the guest, the association between the virtual NUMA node 210-2 and the PXB 214. The management system can then attach the pass-through device 216 to the root bus of the PXB 214 during creation of the virtual machine. Because the PXB 214 is associated with virtual NUMA node 210-2, which in turn is mapped to host NUMA node 220-3, the pass-through device 216 operates more efficiently.

Figure 3:
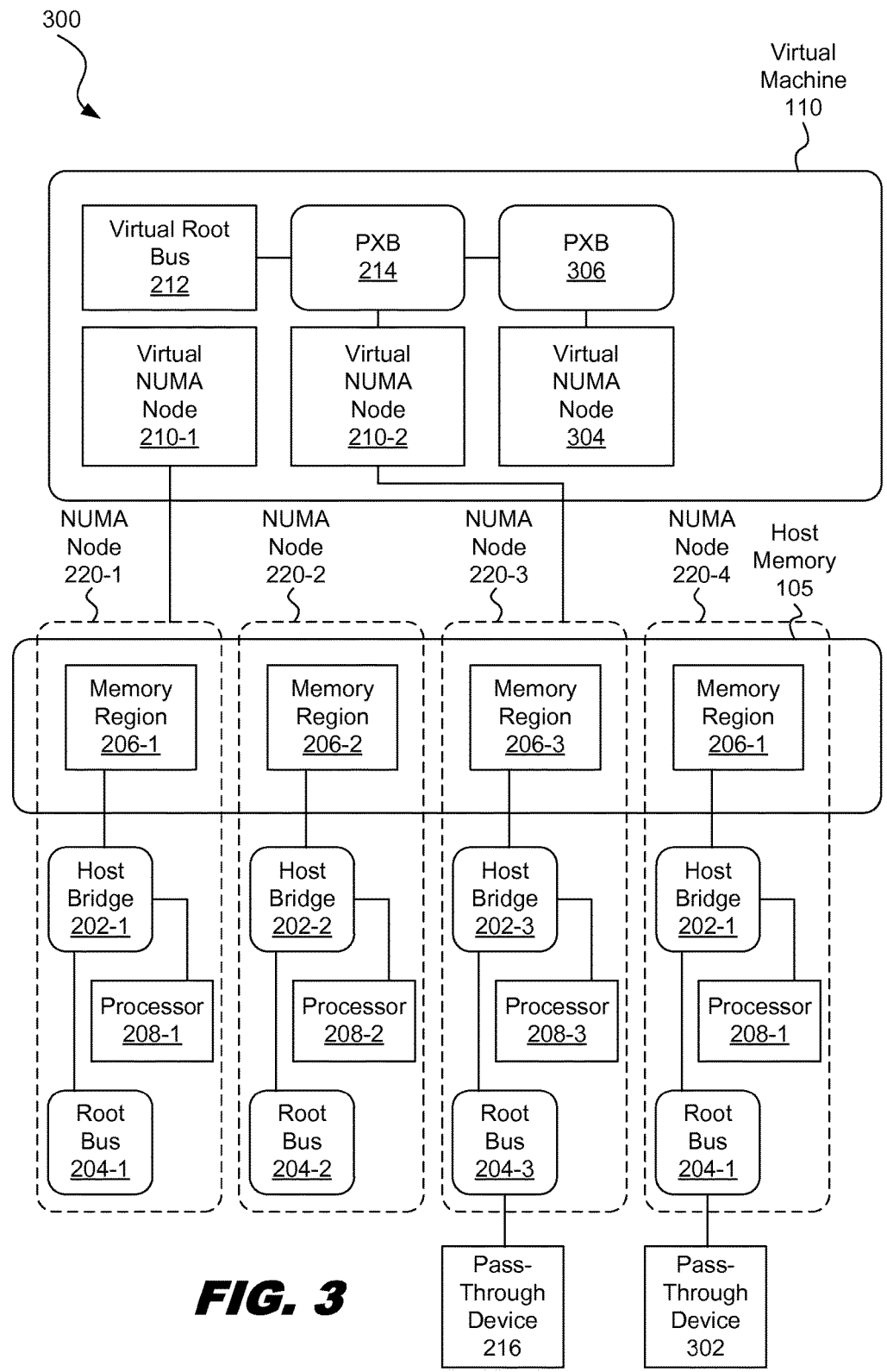
FIG. 3 is a diagram illustrating root bus selection after creation of a virtual machine, according to one example of principles described herein.

FIG. 3 is a diagram illustrating root bus selection after creation of a virtual machine. In some cases, a pass-through device 302 is connected to the virtual machine 110 at some point after the virtual machine has been created. Such a connection is sometimes referred to as a hot-plug. In such cases, the management system creates a new virtual NUMA node 304 after creation of the virtual machine 110. Additionally, the management system creates a new PXB 306. PXB 306 may be connected to a slot behind virtual root bus 212 or a slot behind PXB 214. PXB 306 is associated with the new virtual NUMA node 304. Again, because the pass-through device is attached to a root bus (i.e., the root bus of PXB 306) that is associated with virtual NUMA node 304, which in turn maps to the host NUMA node 220-4 to which the pass-through device 302 is connected, the pass-through device will operate more efficiently.

Figure 4:
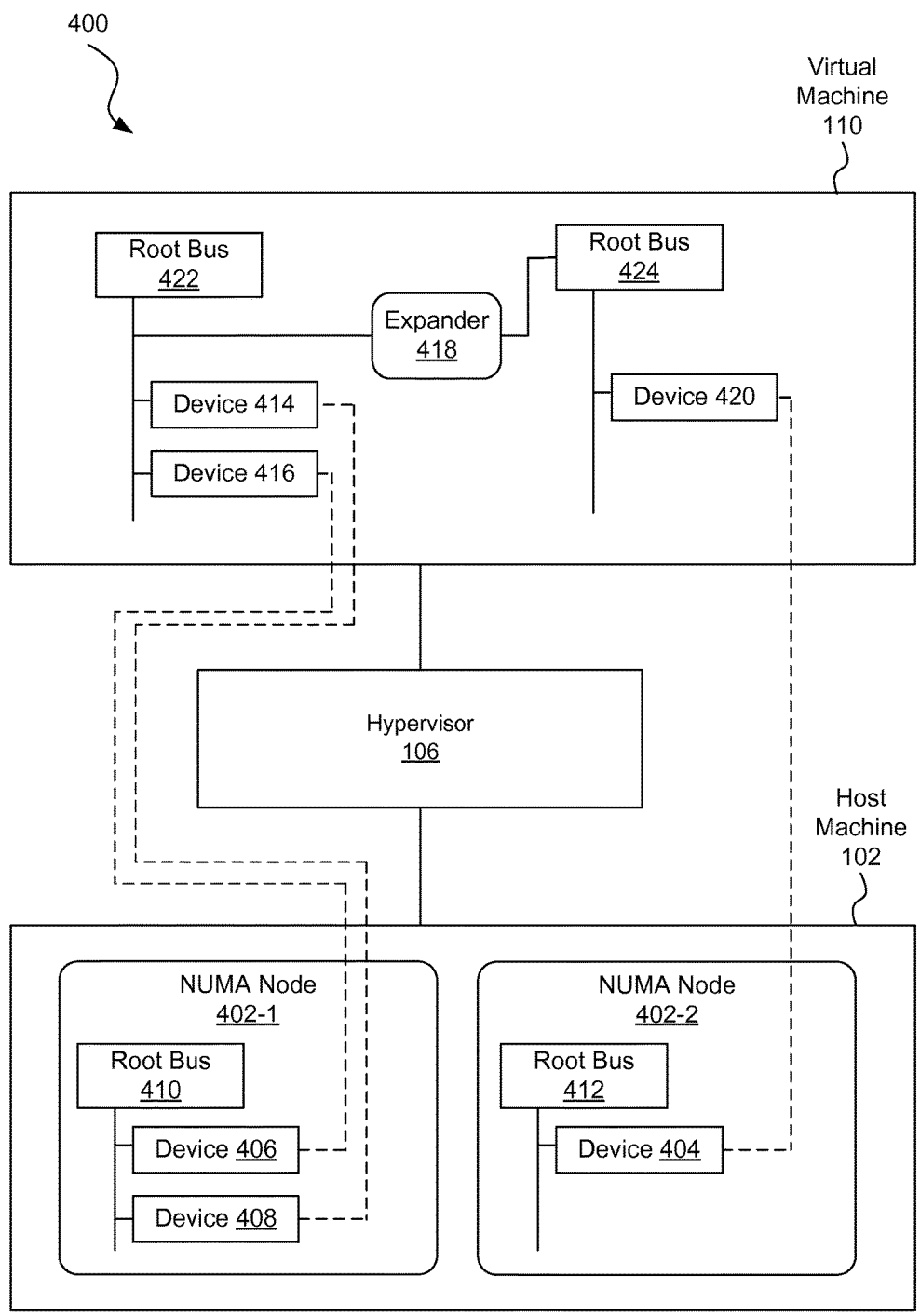
FIG. 4 is a diagram showing an illustrative mapping between a virtual busses and physical busses, according to one example of principles described herein.

FIG. 4 is a diagram showing an illustrative mapping between a virtual busses and physical busses. According to the present example, a system 400 includes a host machine 102 that has two host NUMA nodes 402-1, 402-2. Each host NUMA node 402 has its own root bus. Specifically, host NUMA node 402-1 has root bus 410 and host NUMA node 402-2 has root bus 412. A plurality of physical devices 404, 406, 408 is assigned to the root busses 410, 412. In the present example, devices 406 and 408 are assigned to root bus 410 and device 404 is assigned to root bus 412. There may be additional devices also assigned to the root busses 410, 412 that are not shown. In the present example, up to thirty-two devices may be coupled to a root bus.

In some examples, an expander, such as a PCI-PCI bridge may be coupled to a slot of a root bus 410, 412. Such an expander provides what is referred to as a secondary bus. In the present example, such an expander may provide slots for additional devices to be coupled to the expander. These additional devices are referred to as "downstream of" or "behind" the expander. The devices coupled to the root bus are referred to as "upstream" from the expander. From the point of view of the host, the main host bus comprises a tree structure that includes root bus branches with nodes, wherein each of the nodes may be further branched into additional nodes using an expander. Further branches may be provided downstream by using additional expanders.

The host machine 102 maintains a configuration address space that identifies assignments of the memory and I/O ranges corresponding to the plurality of devices (e.g., devices 406 and 408) coupled to root busses 410 and 412 such that the host machine 102 is able to send data to the devices that are coupled to the buses and receive interrupts from the devices.

In the present example, the hypervisor 106 is configured with access to the host configuration address space. The hypervisor 106 accesses the host configuration address space in order to configure virtual machine devices corresponding to the host machine 102 devices 404, 406, 408. In the present example, the hypervisor 106 configures a virtual machine 110 configuration address space with configuration data corresponding to devices 414, 416, 420, and expander 418. Accordingly, device 414 is mapped to device 406 and device 416 is mapped to device 408. In the present example, expander 418 is a PXB that allows the virtual machine 110 to be configured with additional devices beyond a device number limit that a single root bus 422 can provide. Additionally, the PXB provides an additional root bus 424. The virtual machine 110 assigns memory and I/O address ranges to each of the devices 414, 416, 420 on root bus 422 and root bus 424. A guest running on the virtual machine 110 is able to use the memory and I/O assignments to communicate with the virtual devices 414, 416, 420, which are mapped to the host devices 404, 406, 408 as shown.

In some examples, the virtual machine 110 may be configured with more devices than there is availability for on a single root bus 422. A PXB expander 418 may be attached to one of the thirty-two slots of the root bus 422. The PXB provides a root bus (i.e., root bus 424) that provides an additional thirty-two slots. Root bus 422 may correspond to root bus 212 of FIG. 2, and root bus 424 may correspond to a root bus of PXB 214 of FIG. 2.

In some examples, the devices 414, 416 and 420 may include storage devices. Mapping the devices to root buses (e.g. root bus 222 and root bus 224) offers the advantage of the ability to boot from the devices. In some examples, legacy operating systems may be unable to boot unless the operating systems are stored on devices coupled to a PCI root bus. In these examples, an operating system may be booted by the virtual machine from device 416 and/or device 420 because the devices appear to the operating system as PCI root bus devices.

From the view of the guest, devices coupled to expanders may be viewed as being coupled to additional PCI root buses. For example, the guest running on a virtual machine 110 may view the first device 416 as coupled to a first virtual root bus 422, and the second device 420 as coupled to a second virtual root bus 424. The mapping of the second device 420 to a second virtual root bus 424, on the virtual machine, offers advantages such as allowing booting from the second device. Additionally, the virtual machine may create virtual NUMA nodes that map to the host NUMA nodes. The virtual machine may also associate root bus 424, which is behind the expander 418, with a virtual NUMA node. In other words, root bus 424 acts as a root bus for that virtual NUMA node. Furthermore, device 404 is mapped to device 420.

The following describes the creation of an expander such as PXB 214 of FIG. 2. First, the hypervisor 106 starts the virtual machine 110. At this point in time, a guest operating system of the virtual machine is not yet started. The hypervisor 106 accesses configuration address space of the host, in order to identify the host devices 404, 406, 408 and attach the host devices to the virtual machine 110. In the present example, attaching of host devices to the virtual machine is performed by preparing the configuration address space of the virtual machine based on devices identified in the host configuration address space.

The hypervisor configures the virtual machine's virtual hardware by configuring a PCI root bus in the configuration address space of the virtual machine. In the present example the root bus 422 is referred to as root bus 0. The hypervisor configures a first virtual device 416, which is behind the virtual machine's root bus 0. The hypervisor also configures an expander 418 behind the virtual machine's root bus 0. The expander is associated with a number that identifies a bus number of another root bus (e.g., a second root bus 424).

The hypervisor configures another PCI root bus 424 in the address space of the virtual machine. In the present example the PCI root bus 424 is referred to as root bus 1. The hypervisor configures a second virtual device 420, which is behind the virtual machine's root bus 1. The firmware of the virtual machine scans the virtual machine's virtual hardware by probing the configuration address space of the virtual machine. In the present example, the firmware of the virtual machine is a BIOS. In other examples, the virtual machine firmware is another type of firmware (e.g., UEFI, EFI, and so forth).

In the present example, devices in the configuration address space of the virtual machine may be identified by a root bus number, slot number, and device number. For example, 00:00.0 identifies root bus 0, slot 0 and device 0. A probe of the configuration space may scan a first root bus by probing between 00:00.0 and 00:FF:F. Accordingly, the BIOS of the virtual machine scans all of the devices on root bus 0.

The BIOS identifies devices on bus 0 that are expanders (e.g., PCI Expander Bridge devices). Once the expander is identified on root bus 0, the BIOS is notified that there is a second root bus. The expander is configured in the virtual machine's configuration address space with a number corresponding to a root bus number. In the present example, the number associated with the expander is 1. The identifying of the information from the expander may be referred to as probing the expander. The BIOS uses the number determined from the expander to scan the root bus associated with the number. Because the number in this example is 1, the BIOS is alerted that there are additional devices on root bus 1. Accordingly, the BIOS scans the devices of root bus 1 by probing the configuration address space of the virtual machine between 01:00.0 and 01:FF.F.

In some examples, additional expanders, if present, may expose additional root buses. For example, there may be additional root buses exposed beyond a first root bus and a second root bus. Additional exposed root buses may be similarly scanned based on additional expanders identified during the probing of the root buses.

The BIOS assigns I/O and address ranges to the located devices, as needed, based on the probing of the virtual machine's configuration address space. In the present example, the I/O and address ranges are assigned in the virtual machine's configuration address space. The hypervisor queries the virtual machine's configuration address space to retrieve the memory and I/O addresses that were assigned by the virtual machine's BIOS. The hypervisor prepares ACPI tables that may be accessed by the virtual machine's operating system.

In particular, information such as the bus number ranges and memory or I/O address ranges corresponding to the devices are stored in one or more ACPI tables. In the present example, the information is stored in a particular ACPI table that is referred to as a Secondary System Description Table (SSDT). Devices located by scanning the first root bus are mapped to a first root bus of the virtual machine, in the SSDT. The first root bus of the virtual machine may be referred to as a first virtual root bus. Devices located by scanning the second root bus are mapped to a second root bus of the virtual machine in the SSDT. The second root bus of the virtual machine may be referred to as a second virtual root bus. Additional devices may be assigned to additional root buses, as necessary (e.g., additional expanders may identify a third root bus, a fourth root bus, and so forth).

After the virtual machine is provisioned, a guest operating system is started on the virtual machine. The guest operating system queries the ACPI tables to discover the information contained in the SSDT table. The ACPI tables may be referred to as "exposing" the bus and device information to the guest operating system. The guest operating system determines the number and identify of the root buses, and how the virtual machine's resources are assigned to the root buses. An image may be built that contains the discovered information, such that the guest operating system may quickly access the information as needed. The guest operating system may then finish the boot up (or reboot) process.

Interrupt signals, which are signals used by devices to notify the processor that the device requires attention, are routed from host devices to virtual root buses. The method 400 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

According to the present example, shared interrupt lines are assigned for use by devices coupled to a host's root bus (i.e., the PCI root bus). In the present example, the number of interrupt lines available for each PCI root bus is four. These interrupt lines are shared by devices that are behind PCI root buses as well as devices that are behind expanders that are coupled to the buses.

A first device event is sent from a host device behind the host's root bus 0. The event triggers an interrupt that is received by the processor of the virtual machine. The guest operating system running on the virtual machine receives the interrupt via a main bus of the virtual machine. The guest operating system determines which virtual root buses to check when an interrupt is received. The ACPI tables exposed to the guest operating system identify the virtual buses of the virtual machine. Accordingly, the guest operating system checks the ACPI tables or a data structure derived from the ACPI tables, such as an image to determine the virtual buses.

In the present example, the ACPI tables of the virtual machine include a virtual root bus 0 and a virtual root bus 1. Virtual root bus 1 corresponds to devices behind an expander coupled to root bus 0. The ACPI tables expose the virtual root bus 0 device I/O and memory addresses as well as the virtual root bus 1 device I/O and memory addresses. Accordingly, when the guest operating system receives the interrupt on the main bus, the guest operating system determines that the interrupt may have been sent from a device on either virtual root bus 0 or virtual root bus 1. The guest operating system checks the devices behind virtual root bus 0 and virtual root bus 1 for incoming data.

Figure 5:
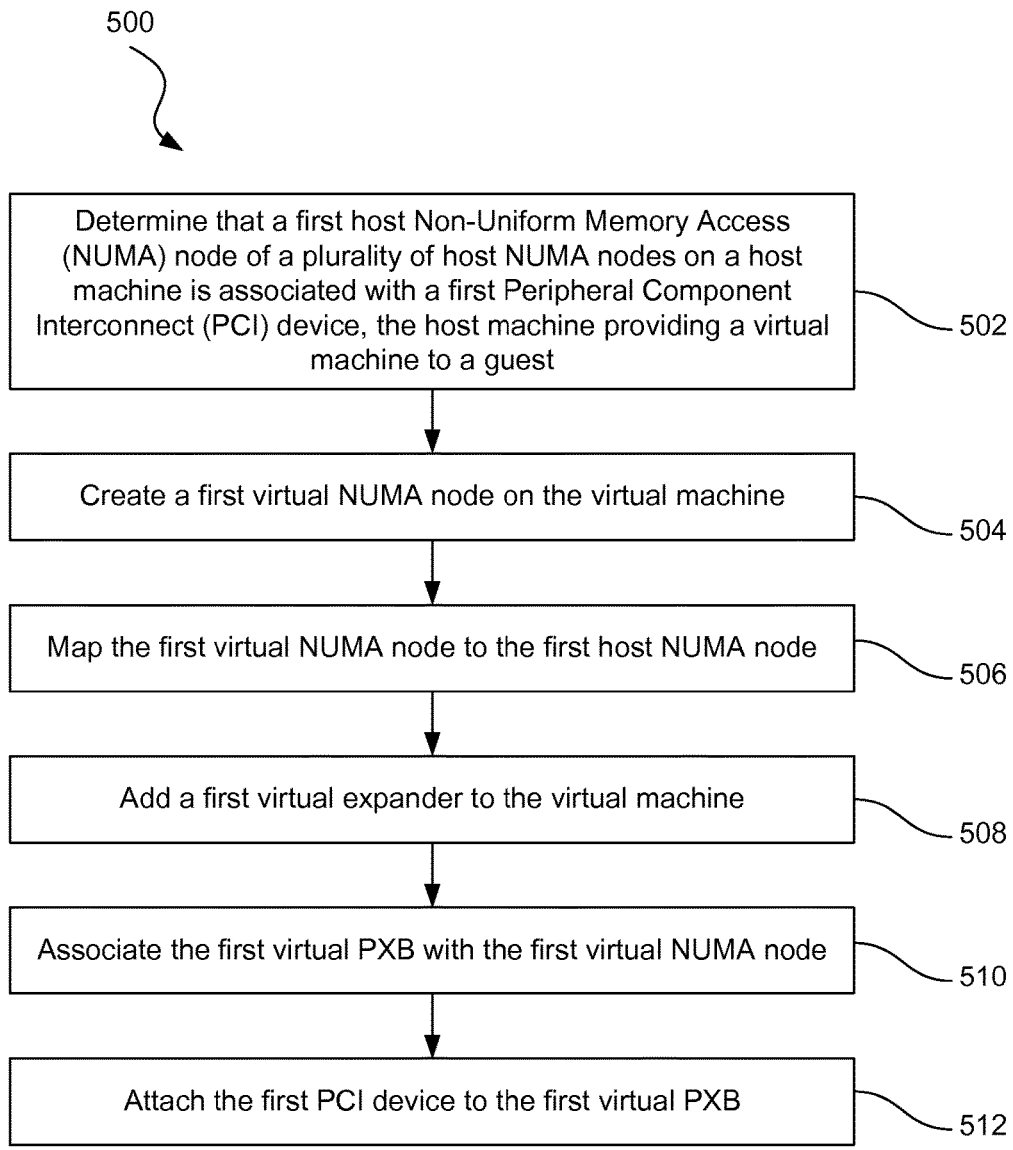
FIG. 5 is a flowchart showing an illustrative method for NUMA-aware root bus selection, according to one example of principles described herein.

FIG. 5 is a flowchart showing an illustrative method 500 for NUMA-aware PCI root bus selection. According to the present example, the method 500 includes a step 502 for determining that a first host Non-Uniform Memory Access (NUMA) node of a plurality of host NUMA nodes on a host machine that provides a virtual machine to a guest is associated with a pass-through device. In one example, a management system (e.g. 114, FIG. 1) queries the host machine to determine the host NUMA node to which the pass-through device is attached. The host operating system can then respond to the management system accordingly. The device is to be attached to a virtual machine running on the host machine. This allows a guest that uses that virtual machine to use the device. The device may be a PCI pass-through device.

The method 500 further includes a step 504 for creating a virtual NUMA node on the virtual machine associated with the guest. This may be done during creation of the virtual machine, or at some point in time after the virtual machine has been created. The virtual NUMA node emulates a physical host NUMA node. In some cases, there may be a different number of virtual NUMA nodes than host NUMA nodes. The method 500 further includes a step 506 for mapping the virtual NUMA node to the first host NUMA node. Thus, data written to guest memory associated with the virtual NUMA node will be physically stored in host memory associated with the first host NUMA node.

The method 500 further includes a step 508 for adding a virtual expander to a virtual PCI root bus of the virtual machine. In one example, the expander is a PXB. Thus, the expander provides a bus that can act like a PCI root bus. The method 500 further includes associating the virtual expander with the virtual NUMA node. The pass-through device can then be attached to the virtual expander. Thus, the pass-through device will be associated with a virtual NUMA node that corresponds to the host NUMA node to which the device is attached. This provides better performance for the device.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a physical computing system, the method comprising:
   determining a first host Non-Uniform Memory Access (NUMA) node of a plurality of host NUMA nodes on a host machine that provides a virtual machine to a guest, the first host NUMA node being associated with a pass-through device;
   creating a virtual NUMA node on the virtual machine;
   mapping the virtual NUMA node to the first host NUMA node;
   adding a virtual expander to a virtual root bus of the virtual machine; and
   associating the virtual expander with the virtual NUMA node.

2. The method of claim 1, wherein adding the virtual expander to the virtual machine is done during creation of the virtual machine.

3. The method of claim 2, further comprising: attaching the pass-through device to a root bus of the virtual expander at creation time of the virtual machine.

4. The method of claim 1, further comprising: attaching the pass-through device to a root bus of the virtual expander after creation of the virtual machine.

5. The method of claim 1, further comprising: querying a host operating system of the host machine to determine which of the plurality of host NUMA nodes is associated with the pass-through device.

6. The method of claim 1, wherein the querying is performed by a management entity external to the host machine.

7. The method of claim 1, further comprising: with a hypervisor running on the host machine, exposing to the guest, an association between the virtual expander and the virtual NUMA node.

8. The method of claim 1, further comprising, maintaining a configuration address space associated with the virtual machine, the configuration address space identifying the virtual expander.

9. The method of claim 1, wherein a root bus attached to the virtual expander emulates a physical root bus.

10. A method performed by a physical computing system, the method comprising:
   determining that a first host Non-Uniform Memory Access (NUMA) node of a plurality of host NUMA nodes on a host machine is associated with a first pass-through device, the host machine providing a virtual machine to a guest;
   creating a first virtual NUMA node on the virtual machine;
   mapping the first virtual NUMA node to the first host NUMA node;
   adding a first virtual Peripheral Component Interconnect (PCI) expander bridge to the virtual machine;
   associating the first virtual PCI expander bridge with the first virtual NUMA node; and
attaching the first pass-through device to the first virtual PCI expander bridge.

11. The method of claim 10, further comprising: determining that a second host NUMA node of the plurality of host NUMA nodes on the host machine is associated with a second pass-through device.

12. The method of claim 11, further comprising: creating a second virtual NUMA node on the virtual machine.

13. The method of claim 12, further comprising: mapping the second virtual NUMA node to the second host NUMA node.

14. The method of claim 13, further comprising: adding a second virtual PCI expander bridge to the virtual machine.

15. The method of claim 14, further comprising: associating the second virtual PCI expander bridge with the second virtual NUMA node.

16. The method of claim 15, further comprising: mapping the second virtual PCI expander bridge to a PCI root bus of the second host NUMA node.

17. The method of claim 16, further comprising: attaching the second pass-through device to a root bus of the second virtual PCI expander bridge.

18. A management system comprising:
   a processor; and
   a memory comprising machine readable instructions, that when executed by the processor, cause the system to:
      query a host machine to determine that a first host Non-Uniform Memory Access (NUMA) node of a plurality of host NUMA nodes of the host machine is associated with a pass-through device, the host machine providing a virtual machine to a guest;
      add a virtual NUMA node on the virtual machine, the first virtual NUMA node being mapped to the first host NUMA node;
      add a virtual PCI expander bridge to the virtual machine, the virtual PCI expander bridge being associated with the virtual NUMA node; and
      attach the pass-through device to a root bus of the first virtual PCI expander bridge.

19. The management system of claim 18, wherein to attach the pass-through device, the system is to attach the pass-through device to the root bus of the first virtual PCI expander bridge at creation of the virtual machine.

20. The management system of claim 18, wherein to attach the pass-through device, the system is to attach the pass-through device to the root bus of first virtual PCI expander bridge after creation of the virtual machine.

* * * * *